United States Patent
Reed

(10) Patent No.: US 7,460,027 B2
(45) Date of Patent: Dec. 2, 2008

(54) SENSOR CORD ARRAY AND METHOD WITH CONDUCTIVE SENSORS FOR DETECTING ACTIVITY ON OR AROUND AN OBJECT

(75) Inventor: John W. Reed, Baltimore, MD (US)

(73) Assignee: Progressive Engineering Technologies Corp., Columbia, MD (US)

( * ) Notice: Subject to any disclaimer, the term of this patent is extended or adjusted under 35 U.S.C. 154(b) by 169 days.

(21) Appl. No.: 11/334,374

(22) Filed: Jan. 19, 2006

(65) Prior Publication Data

US 2007/0163365 A1    Jul. 19, 2007

(51) Int. Cl.
    *G08G 1/01*    (2006.01)
(52) U.S. Cl. .................. 340/933; 340/941; 340/934
(58) Field of Classification Search .......... 340/933
    See application file for complete search history.

(56) References Cited

U.S. PATENT DOCUMENTS

| | | | | |
|---|---|---|---|---|
| 3,830,991 | A | * | 8/1974 | Durocher .................. 200/86 R |
| 4,795,998 | A | * | 1/1989 | Dunbar et al. .................. 338/5 |
| 5,047,602 | A | * | 9/1991 | Lipka ........................ 200/86 R |
| 5,239,148 | A | * | 8/1993 | Reed ........................ 200/86 A |
| 5,360,953 | A | | 11/1994 | Reed |
| 5,373,128 | A | * | 12/1994 | Rosakranse et al. ....... 200/86 A |
| 5,674,752 | A | * | 10/1997 | Buckley et al. .............. 436/151 |
| 5,779,241 | A | * | 7/1998 | D'Costa et al. .............. 273/371 |
| 6,543,299 | B2 | * | 4/2003 | Taylor .................... 73/862.046 |
| 6,744,378 | B1 | * | 6/2004 | Tyburski ..................... 340/933 |
| 6,877,808 | B2 | * | 4/2005 | Lichtinger et al. ........ 297/217.3 |
| 2003/0173982 | A1 | * | 9/2003 | Ishii et al. .................... 324/663 |
| 2005/0007104 | A1 | * | 1/2005 | Lequesne et al. ........ 324/207.25 |

FOREIGN PATENT DOCUMENTS

JP        2003339805 A  *  12/2003

* cited by examiner

*Primary Examiner*—Jeff Hofsass
*Assistant Examiner*—Kerri L McNally
(74) *Attorney, Agent, or Firm*—Foley & Lardner LLP

(57) ABSTRACT

A sensing device for sensing activity on or around an object, includes sensor cords provided in a parallel or a substantially parallel arrangement. Each sensor cord includes sensors disposed adjacent one another. Each sensor includes a resilient top portion having at least one resilient conductive member, and a resilient lower portion having active sections and resilient lower portion conductive members channeled and interconnected through the lower portion, the lower portion conductive members being separated by non-conductive material. Each active section further includes a layer of resilient conductive material at a top of the lower portion, resilient non-conductive material arranged over the lower conductive members to insulate the lower portion conductive members from the conductive layer, and a communicating conductive material to connect one of the conductive members to the resilient conducting material on top of the active section.

25 Claims, 12 Drawing Sheets

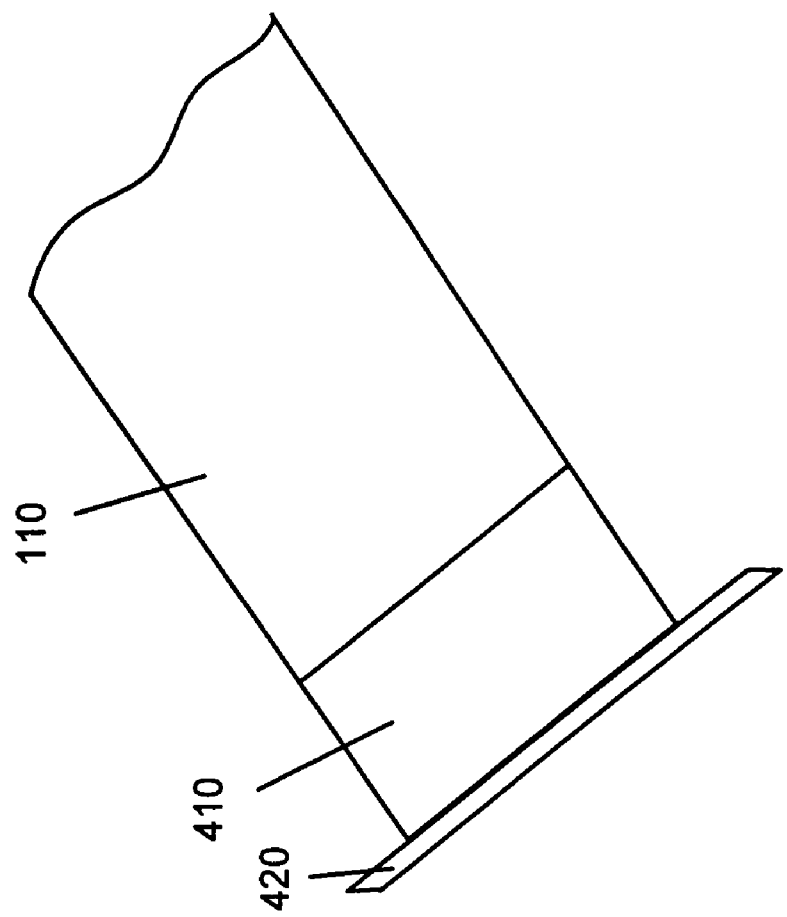

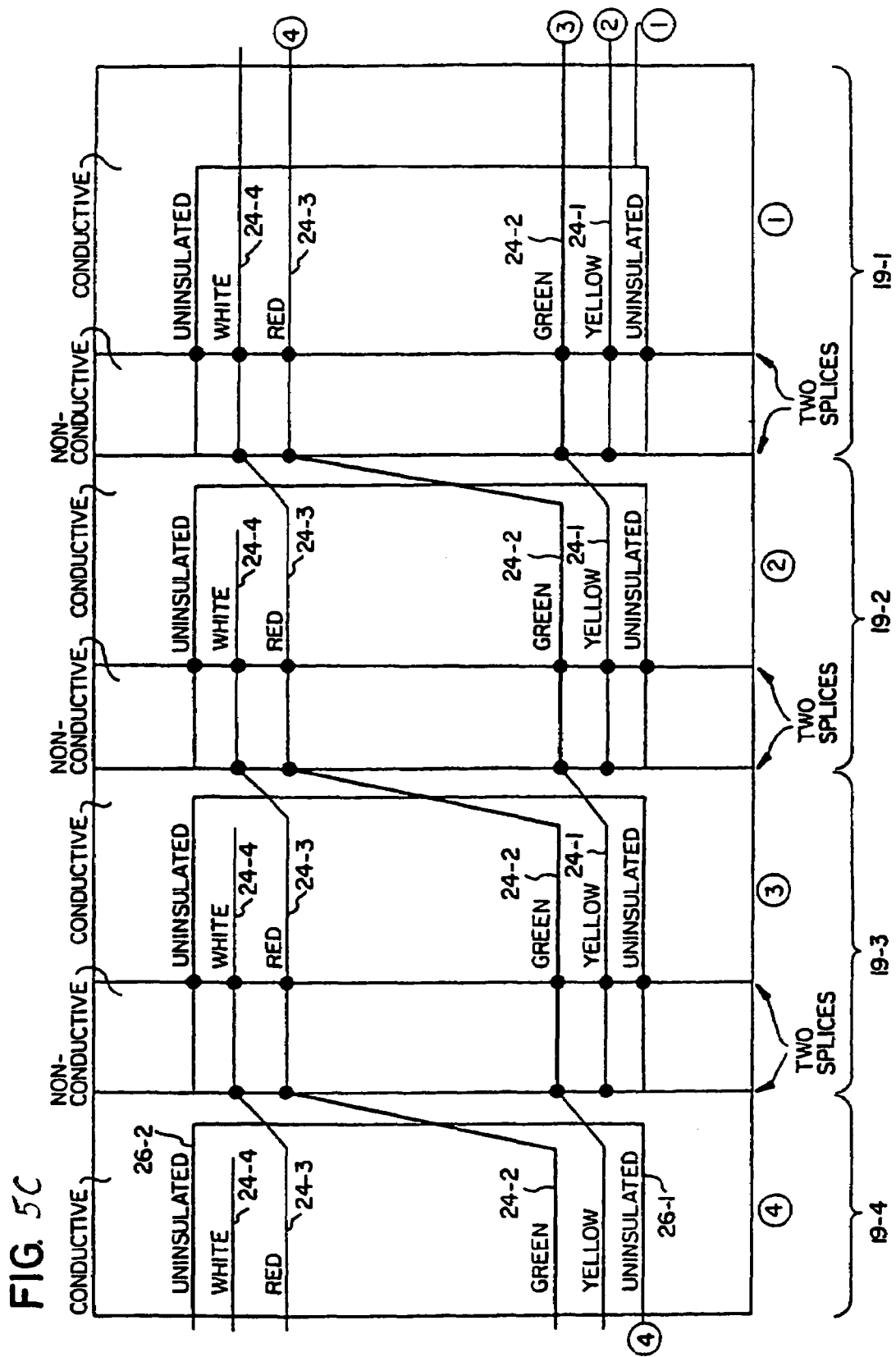

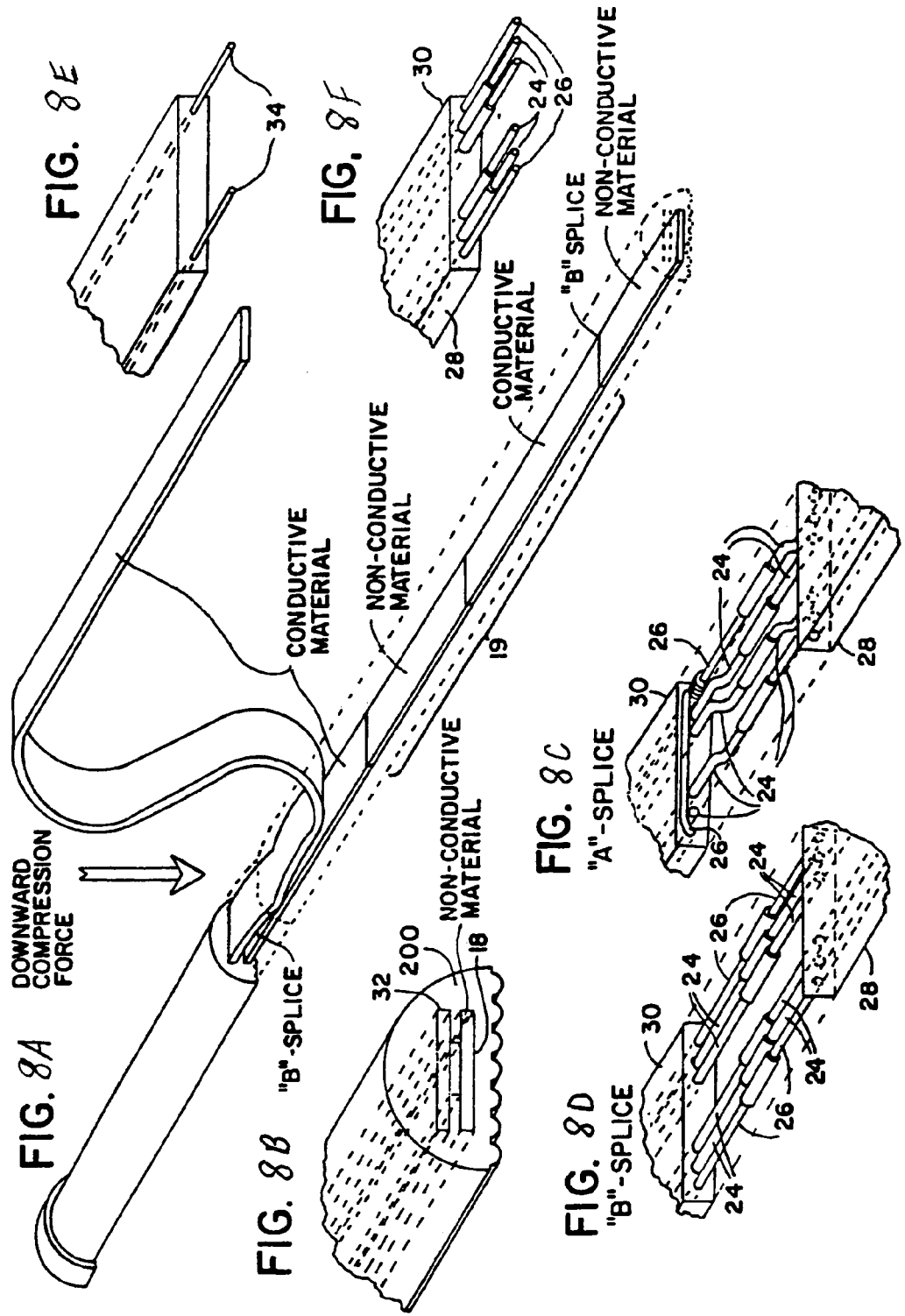

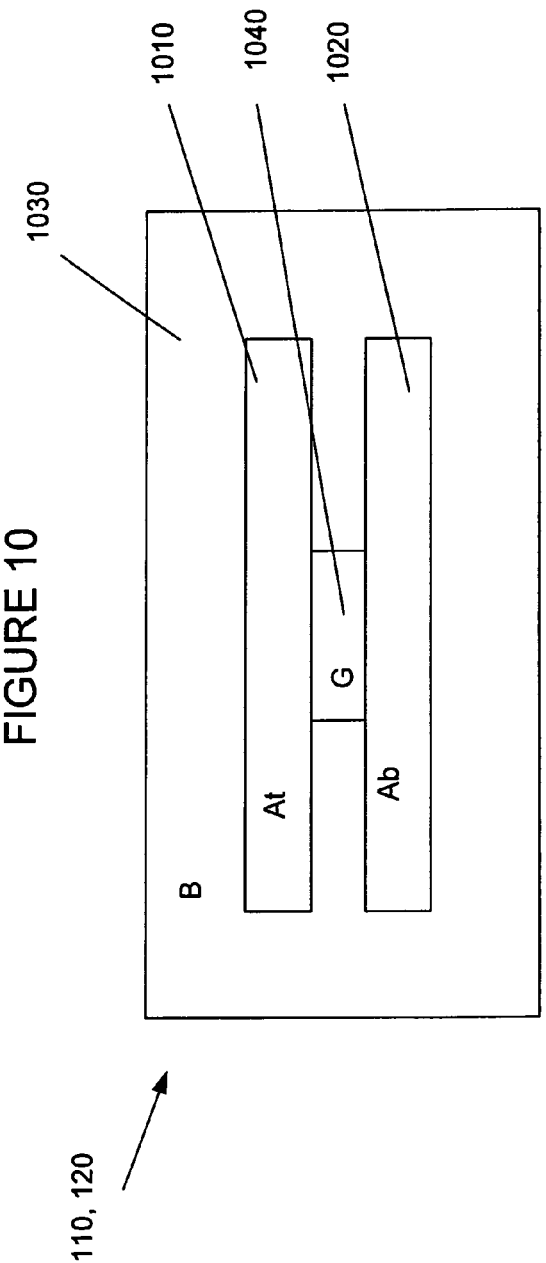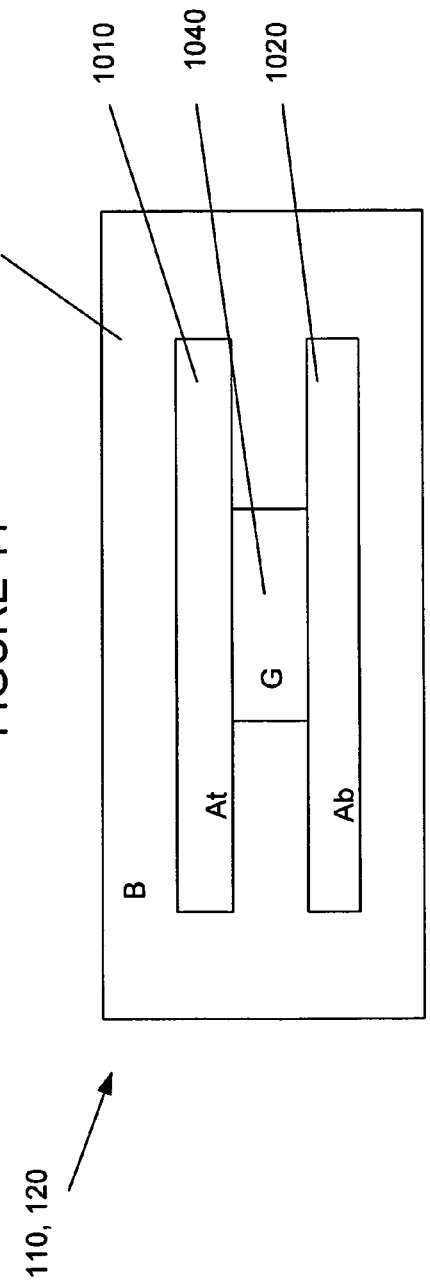

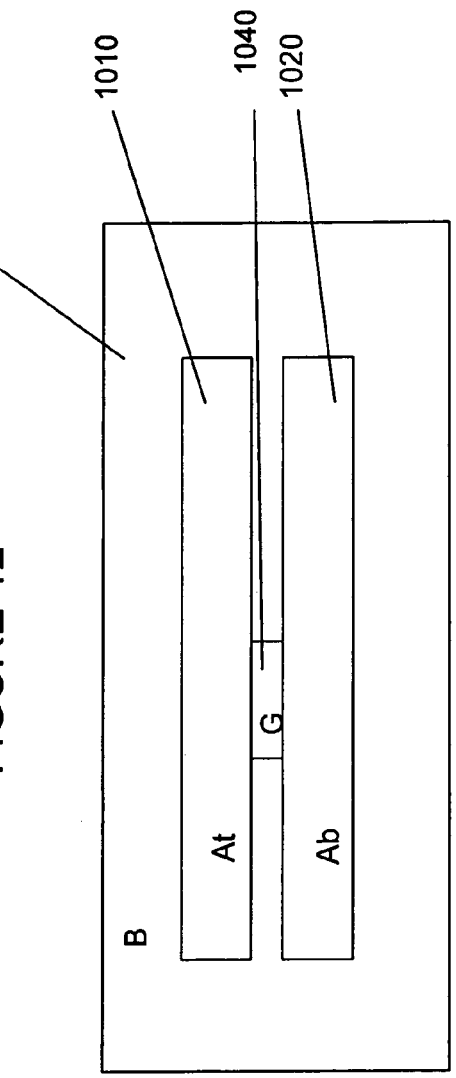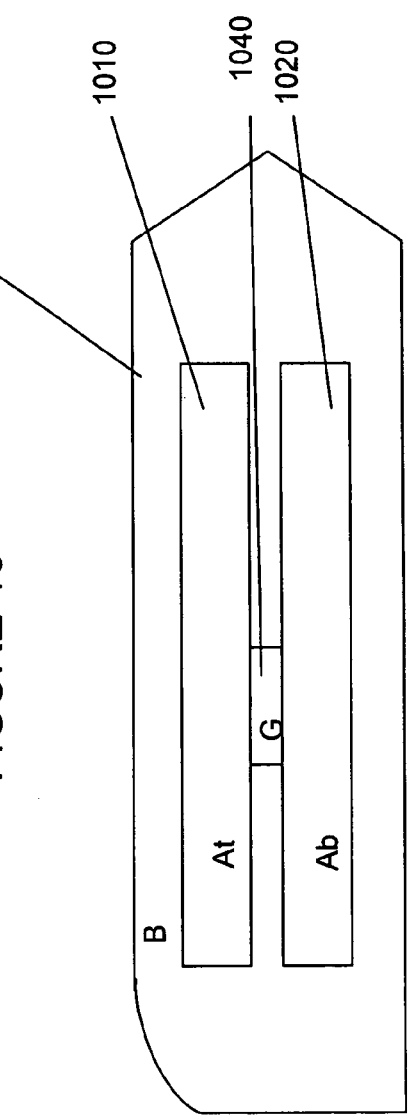

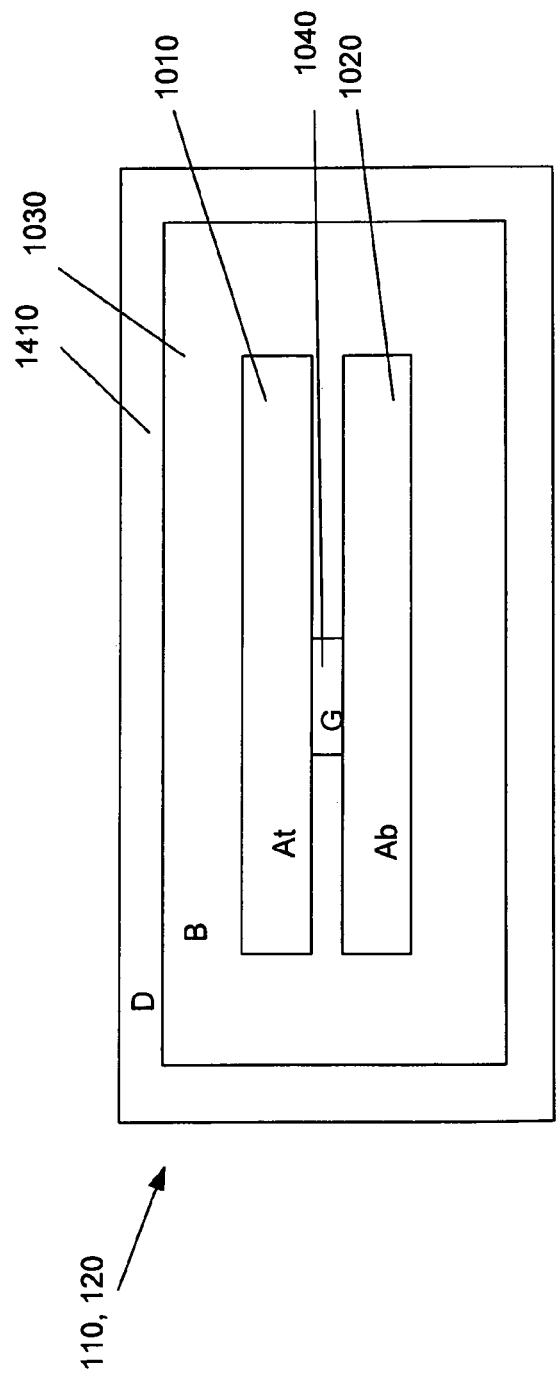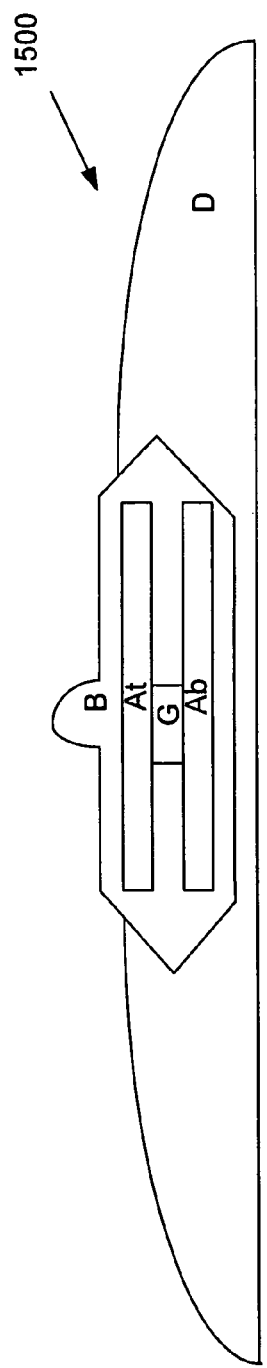

US 7,460,027 B2

SENSOR CORD ARRAY AND METHOD WITH CONDUCTIVE SENSORS FOR DETECTING ACTIVITY ON OR AROUND AN OBJECT

BACKGROUND OF THE INVENTION

The present invention relates generally to sensors, to the use of sensor arrays to detect and/or monitor components and/or locations.

Sensors are used for a variety of purposes, including protection of regions (e.g., home security system), detecting conditions (e.g., vehicle speed sensor used in traction control) that cause a computer processor to cause a particular output based on the detected condition, etc.

It is desirable to come up with a sensor system and method that is suitable for a particular purpose, both in size and in ease in construction of the system.

SUMMARY OF THE INVENTION

One aspect of the invention relates to a sensor system for sensing a breach of a location or an external force applied to an object surrounded by the sensor system.

According to that at least one aspect of the invention, there is provided a sensing device, which includes a plurality of sensor cords provided in a substantially parallel arrangement, each of the sensor cords including a plurality of sensors disposed adjacent one another. Each of the sensors includes a resilient top portion having at least one resilient conductive member. Each of the sensors also includes a resilient lower portion having a plurality of active sections and a plurality of resilient lower portion conductive members channeled and interconnected through the lower portion, the lower portion conductive members being separated by non-conductive material. Each active section further includes a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section.

According to that at least another aspect of the invention, there is provided a method for sensing an event or condition, which includes providing a plurality of sensor cords in a parallel or substantially parallel arrangement, each of said sensor cords including a plurality of sensors disposed adjacent one another. Each of the sensor cords includes a resilient top portion having at least one resilient conductive member; a resilient lower portion having a plurality of active sections and a plurality of resilient lower portion conductive members channeled and interconnected through the lower portion, the lower portion conductive members being separated by non-conductive material. Each active section further includes a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section. The method also includes sensing the event or condition by way of activation of at least one sensor provided on at least one of said plurality of sensor cords.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 4 is a diagram showing a blown-up view of one end of one of the sensor cord that is communicatively connected to an integrated circuit, according to the first embodiment;

FIG. 5C shows electrical connections of splices between sections of a sensor cord that may be utilized in a sensor array that includes a plurality of sensor cords, according to the second embodiment;

FIG. 8A shows an overall perspective cutaway illustrating an entire sensor cord that may be utilized in the sensor array according to the second embodiment;

FIG. 8B is an exploded view of an "A" splice that may be utilized in the sensor array according to the second embodiment;

FIG. 8C is an exploded view of an end perspective of a sensor cord that may be utilized in the sensor array according to the second embodiment;

FIG. 8D is an exploded view of an "B" splice that may be utilized in the sensor array according to the second embodiment;

FIG. 8E is an exploded view of a top wire that may be utilized in the sensor array according to the second embodiment;

FIG. 8F is an exploded view of a bottom wire that may be utilized in the sensor array according to the second embodiment;

FIG. 10 is a cross-sectional view showing a sensor cord with an air gap provided between top and bottom portions and which is surrounded by a non-conductive cover material, according to a second embodiment;

FIG. 11 is a cross-sectional view showing a sensor cord with a longer-length air gap than what is shown in FIG. 10, in order to lessen the sensitivity of the sensor cord, according to the second embodiment;

FIG. 12 is a cross-sectional view showing a sensor cord with a smaller-sized (in length and width) air gap than what is shown in FIGS. 10 and 11, in order to increase the sensitivity of the sensor cord, according to the second embodiment;

FIG. 13 is a cross section view of a cover material provided around a sensor cord in which the cover material has a particular shape to suit a particular purpose of a sensor array that includes the sensor cord, according to a particular implementation of the second embodiment;

FIG. 14 is a cross section view of an outside protective cover provided around a cover material provided around a sensor cord, according to a particular implementation of the second embodiment; and FIG. 15 shows a sensor cord that has both a cover material and an outside protection cover provided around it, according to a particular implementation of the second embodiment.

DETAILED DESCRIPTION OF THE PREFERRED EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

U.S. Pat. Nos. 5,360,953 and 5,239,148, which are incorporated in their entirety herein by reference, and which were invented by the same inventor as this application, describe a lane discriminating traffic counting device. The inventor has determined that, by using an array of sensors and by modifying the sensor durometer and size to suit a particular purpose, sensors used in these traffic counting devices can be provided in sensor arrays and modified for use in a variety of other applications that were not contemplated in these patents. In the '953 and '148 patents, a traffic counting cord having a plurality of sensors provided along the length of the cord was utilized to count traffic from multiple lanes of traffic using only that one cord.

In a first embodiment of the invention, a plurality of cords (also referred to herein as "strips"), such as the cords described in the above-mentioned patents, are placed in a parallel or substantially parallel relationship (e.g., within 15% of exactly parallel) to one another. This creates an array (or matrix) of sensors, whereby the array of sensors can be utilized in a variety of different applications to monitor and/or detect particular conditions or events. The use of an array of sensors allows for coverage of an area beyond the physical size of the sensor. This can be accomplished, for example, by laying the sensors side by side on the ground.

Figure 1:
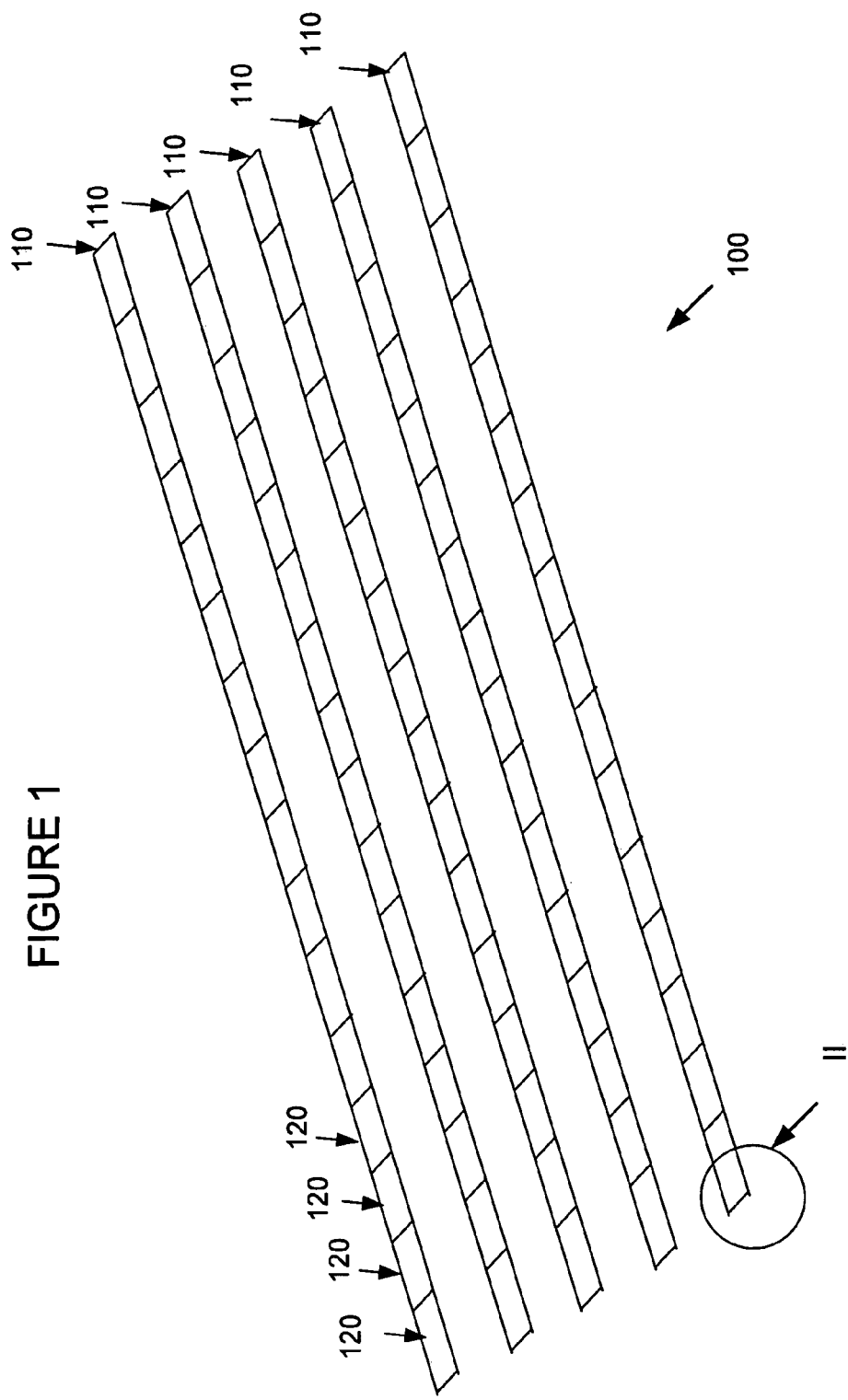
FIG. 1 is a diagram showing a plurality of sensor cords positioned so as to provide an array of sensors, according to a first embodiment of the invention.

FIG. 1 shows a sensor array 100 according to the first embodiment, whereby the sensor array 100 includes five (5) cords (or strips) of sensors 110 placed side by side in a parallel or substantially parallel arrangement. In FIG. 1, each of the five cords 110 includes 16 separate sensors (also referred to herein as "segments") 120 adjacently positioned along the length of the cord 110, whereby the length of the cord 110 can be sized to suit a particular purpose. For purposes of example and not by way of limitation, each cord 110 is six (6) feet in length, but one of ordinary skill in the art will recognize that other sizes both larger and smaller than six feet (e.g., 2 inches, 1000 feet) may be contemplated to suit a particular purpose, while remaining within the spirit and scope of the invention.

In the case where the cord 110 is six feet in length with 16 separate sensors 120 per cord 110, each sensor 120 is 4.5" in length, and is 0.25" in width. One of ordinary skill in the art will recognize that other sizes for the sensors 120 may be contemplated while remaining within the spirit and scope of the invention.

Figure 2:
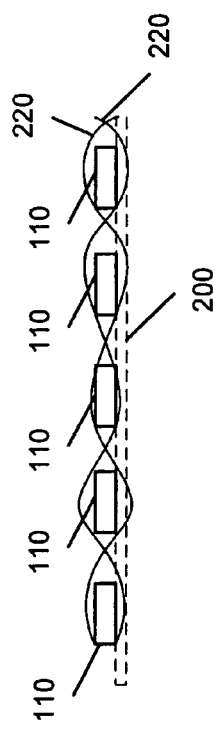
FIG. 2 is a diagram showing a front view of a plurality of sensor cords that are securely positioned onto an object, such as a net or floor covering, by way of thread, according to the first embodiment.

In the first embodiment, a flexible membrane such as nylon thread, neoprene or cotton, can be utilized to hold the individual sensors in place and to act as a structural base for the sensor array 100. That way, each of the sensor cords 110 can be rigidly attached to another object, such as a net or a blanket or a mat, and held in place at a predetermined position on that other object. Other means of rigid attachment of the sensors to an object, such as glue or the use of VELCRO™ or another type of mechanical fixing device, may be contemplated while remaining within the scope of the invention. FIG. 2 shows five separate cords 110 of a sensor array that are securely held in place onto an object 200 (shown with dashed lines) via threads 220 that are sewn onto the object 200. The threads 220 may be made of nylon or another material that provides for a sturdy and durable thread.

The intended use of the sensor array 100 will determine the precise material and dimensions to be used. By varying the distance between the sensors cords 110 of the sensor array 100, the sensor material durometer, and the number and length of the segments 120 in each sensor cord 110, the resolution of detection inside an area being monitored can be adjusted to suit a particular application.

One example of use would be for a coverage area that could be as small as a few square inches with a very soft durometer material which would stretch but which will also be strong. The membrane used would preferably match the sensor's characteristics and the end products could be used in health care, for example, as a 'smart' brace for use in physical therapy. Movement of a patient's wrists, elbows, knees and shoulders could be monitored by way of the sensor array 100 being secured to a knee pad, elbow pad, and/or wrist pad, and progress could be recorded and automatic tension and strength adjustments could be made thru feedback provided from the sensors back to the patient.

Another use of the sensor array 100 according to the first embodiment would be as a "security skin" used to line the inside of cargo containers. In particular, a membrane is provided similar to what is used inside of freight elevators to protect the walls from damage when moving large objects. The "security skin" would be used to monitor the stresses seen throughout shipping, and would be interfaced with existing electronic locks in use today. Tampering with the cargo would be recorded electronically. The retrofitting and system interfacing could be done at minimal cost.

As with the product described above, another use of the sensor array 100 according to the first embodiment in the protection of cargo would be the creation of a "security net". The membrane would preferably be a strong light weight flexible material such as a nylon cord. The sensors and nylon are preferably woven into the "security net" (see FIG. 2, for example), using nylon thread, for example, whereby the "security net" which would cover the cargo and be bundled tightly together with the cargo. Once monitoring of the bundled cargo begins using the "security net", it would be very difficult if not impossible to tamper with the cargo without the tampering being detected by the "security net".

In a similar manner as described above, another use of the sensor array 100 according to the first embodiment is in the protection of roadsides, borders, military compounds and/or bases. For example, one or more sensor arrays 100 can be placed around the circumference of a military compound or base, to detect illegal entrance or exit to/from the compound or base. When a person attempts to enter or leave the base illegally, that person will contact one or more sensors provided around the compound or base, whereby the weight of the person would cause the one or more sensors to be 'enabled', and whereby that information would be provided to a processing component that would track the exact location and time of the 'breach'.

With the use of the sensor array 100 according to the first embodiment, very large areas could be covered at relatively low cost. The sensor array 100 could be easily deployed and would be extremely durable. The basic design of the "security net" above for a cargo application can be used, but the materials and dimensions changed to match the intended use. The net could be placed on the ground and covered with a small amount of sand or earth, to make it hidden from view of an intruder. Stakes could be used also to assure the position of the sensor array 100 stayed in place during all types of weather events. The housing for the sensor array 100 would preferably be a durable material, such as MYLAR™.

The concept of placing the sensor array 100 according to the first embodiment under something could also be applied to carpet or synthetic turf. Very large areas, such as airports or stadiums, could be fitted and monitored with a system such as this for security and/or training. Retail and marketing firms would benefit from this system being able to track customers through stores and determine tendencies. Home and office would benefit through a security system and/or employee tracking system for managerial and/or payroll purposes.

Figure 3:
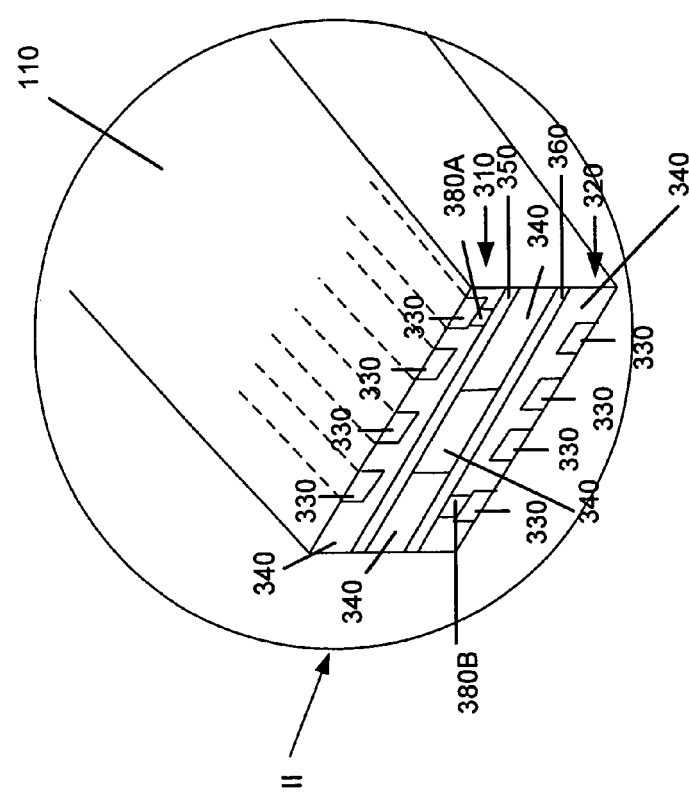
FIG. 3 is a diagram showing a blown-up view of one end of one of a sensor cord that is part of the array of sensors, according to the first embodiment.

FIG. 3 shows a blown-up view of an end of one of the sensor cords 110 shown in FIG. 1, whereby each sensor cord 110 has a similar construction. This construction is described in detail in the '148 and '953 patents discussed earlier, with respect to use in traffic counting, whereby the first embodiment utilizes a somewhat similar construction for providing a sensor array 100 that has multiple different uses separate from traffic counting.

In particular, FIG. 3 shows a sensor cord 110 having a top portion 310 and a bottom portion 320, whereby both the top portion 310 and the bottom portion 320 have a plurality of individual conductive members 330 (four shown for each of the top and bottom portions) that are formed of resilient conductive material. Each of the conductive members 330 is surrounded by non-conductive material 340 provided above and between them. The presence of this non-conductive material 340 separates the conductive members 330 from each other and prevents switch closure from occurring when a conductive layer 350 provided at the bottom of the top portion 310 and a conductive layer 360 provided at the top of the bottom portion 320 are not pressed against each other to thereby provide a 'closed' conductive path. Each conductive member 330 has a channel shape that spans the entire length of the sensor cord 110, as shown by the dashed lines in FIG. 3.

The conductive layer 350 of the first segment 120 in the sensor cord 110 spans the entire length of that segment, and is separated from the conductive layer 350 of the second segment 120 by a thin non-conductive region. A similar composition is provided for the top portion 310 of each of the other 15 segments 120 of the sensor cord 110. In a similar construction, the conductive layer 360 of the first segment 120 in the sensor cord 110 spans the entire length of that segment 120, and is separated from the conductive layer 360 of the second segment 120 by a thin non-conductive region. A similar composition is provided for the bottom portion 320 of each of the other 15 segments 120 of the sensor cord 110.

Figure 9:
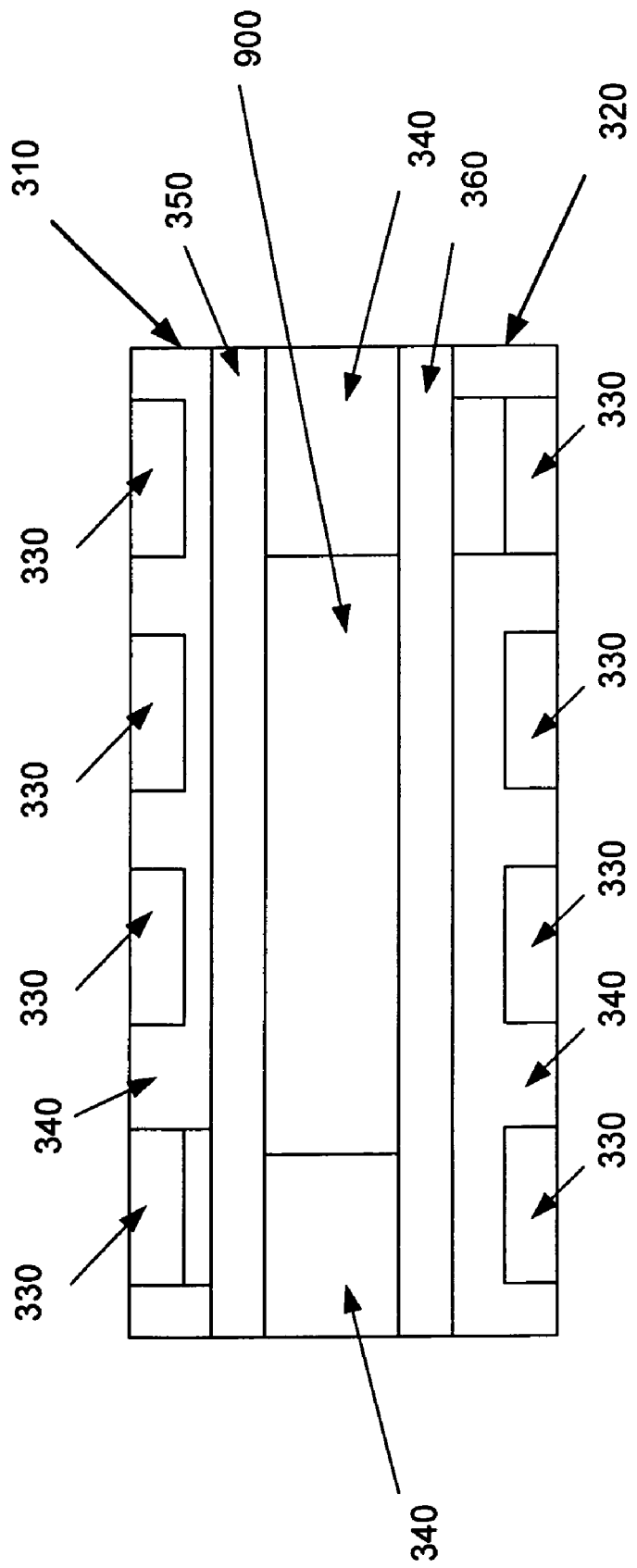
FIG. 9 is a cross-sectional view showing an air gap region between a top portion and a bottom portion of a sensor segment, according to the first embodiment.

In a non-activated, non-pressed together state, the conductive layer 350 provided at the bottom of the top portion 310 and the conductive layer 360 provided at the top of the bottom portion 320 are separated from each other by an air gap region 900, as seen best in FIG. 9. The height and/or width of the air gap region 900, as well as the choice of material used for the various components making up the top and bottom portions 310, 320, is chosen based on the amount of force that is to be detected, whereby any force less than this 'detectable force' would not cause contact between the conductive layers and thus would not be sensed by the sensor array. In a different configuration, a region that surrounds that almost completely surrounds the air gap region 900 (but with an opening at the top and bottom to allow the conductive layers of the top and bottom portions to contact each other when a force is applied to the sensor segment 120) is chosen so as to have a particular stiffness or resilience in order to meet a particular force detection criterion. In one example, for a sensor cord 110 that has a fairly flexible property, such as one being made of silicon rubber, styrene butadiene rubber or ethyl propylene rubber, in order to make such a sensor cord 110 have a higher detection threshold would involve adding a region almost totally surrounding the air gap region 900 for each sensor segment that has a more rigid composition, such as by using nylon or PVC material or polyester material in the region surrounding the air gap region 900.

As shown in FIG. 3, a communicating conductor 380A is provided between the fourth (of the four) individual conductive members 330 and the conductive layer 350 on the top portion 310 of the first sensor (or segment) on the cord 110 of 16 sensors, and a communicating conductor 380B is provided between the first (of the four) individual conductive members 330 and the conductive layer 360 on the bottom portion 320 of the first sensor (or segment) on the cord 110 of 16 sensors. The second sensor that is directly adjacent to the first sensor on the cord 110 of 16 sensors would have its third (of the four) individual conductive members 330 on the top portion 310 communicatively connected to the conductive layer 350 by way of a communicating conductor, with a communicating conductor 360 is provided between the first (of the four) individual conductive members 330 and the conductive layer 360 on the bottom portion 320 of the second sensor on the strip of 16 sensors (the same as the configuration of the bottom portion 320 for the first sensor). The communicating conductors 350, 360 only span the length of that particular sensor segment 120 for which they are provided.

In a similar manner, each of the other 14 sensors on the sensor cord 110 has a unique coupling (with respect to that sensor cord 110) of one of the four upper conductive members 330 with the conductive layer 350 and one of the four lower conductive members 330 with the conductive layer 360 when that sensor's top portion 310 and bottom portion 320 are pressed together. This provides a unique sensor activation signal to an integrated circuit device coupled to the sensor cord 110, which indicates that a particular sensor or sensors of the 16 sensors has detected a force applied to that sensor of sufficient strength. That detection might correspond to an unauthorized access to an object in the case where the sensor array 100 is wrapped around or positioned around an object, whereby that unauthorized access would cause the top portion 310 and the bottom portion 320 of one or more sensors to make contact with each other.

FIG. 4 shows one end of a sensor cord 110 that is interfaced with processing circuitry 410, according to the first embodiment. The processing circuitry 410, shown in FIG. 4 as an integrated circuit (IC), is communicatively connected to each of the four upper and lower conductive members 330. The processing circuitry 410 thereby receives the signals from the 16 sensors of the sensor cord 110, and, based on the information provided to it, determines whether or not any of the 16 sensors making up the sensor cord 110 has been 'activated' (e.g., the top conductive portion 310 contacting the bottom conductive portion 320 of one or more sensors). In one possible implementation, there is one IC provided for each sensor cord 110. In an alternative implementation, there is one IC provided for the entire sensor array 100, whereby the sensor cords 110 not directly connected to the IC provide their sensor activation signals to the IC via wireless or wired communications.

In one possible implementation, the IC 410 has a unique address (e.g., digital address) separate from the other ICs 410 connected to other sensor cords 110. That way, information provided by the IC 410 to a central location (e.g., a central computer with a display) is determined to come from a particular one of the sensor cords 110. In order to determine whether or not a particular sensor segment 120 has been activated on the sensor cord 110 connected to the IC 410, the IC 410 outputs a unique signal on each separate signal line connected to the conductive members 330 on the bottom portion 320 of each sensor segment 120. In other words, for the four-conductive member implementation shown in FIG. 3, a digital signal 00 is output on a signal line from the IC 410 to the right-most conductive member 330 on the bottom portion 320, a digital signal 01 is output on a signal line from the IC 410 to the middle-right conductive member 330 on the bottom portion 320, a digital signal 10 is output on a signal line from the IC 410 to the middle-left conductive member 330 on the bottom portion 320, and a digital signal 11 is output on a signal line from the IC 410 to the left-most conductive member 330 on the bottom portion 320. Based on which sensor segment 120 is in an activated (e.g., pressed together) state, one of the conductive members 330 on the top portion of one or more of the sensor segments 120 will provide a unique digital signal (00, 01, 10, and/or 11) back to the IC 410, due to the circuit being closed between the top and bottom portions 310, 320 of those one or more sensor segments 120.

The periodicity of the signals output by the IC 410 can be anywhere from one microsecond to one or more seconds to longer times, whereby the choice of signal output times is based on the determination as to how often information is to be gathered from the sensor array 100. When no signals are received from the IC 410 by way of the conductive members 330 on the top portion 310 of the sensor segments 120, this indicates that none of the sensor segments 120 has been tripped for that time period.

In an alternative implementation of the one described above, a unique analog signal may be output on each separate line of the IC 410 to the sensor cord 110, whereby receipt of that unique analog signal by way of a conductive member 330 on the activated (e.g., top and bottom portions pressed together) top portion of one or more sensor segments of the sensor cord 110 will provide an indication to the IC 410 as to which, if any, of the sensor segments have been activated.

As shown in FIG. 4, the processing circuitry 410 is preferably implemented as a single integrated circuit, which is communicatively coupled to one end of the sensor cord 110. The processing circuitry 410 also preferably includes power, ground and signal interface circuitry for the sensors of the sensor cord 110. With such a configuration, a three-conductor interface is provided between the sensor cord 110 and the processing circuitry 410 connected to one end of the sensor cord 110. A suitable housing is also provided for the processing circuitry, in order to protect the processing circuitry from external forces. In FIG. 4, a three-conductive interface 420 is provided around the processing circuitry 410. This interface 420 may correspond to a MYLAR™ wrapping in one possible implementation.

The processing circuitry 410 is either directly coupled to a computer (not shown), or indirectly coupled (e.g., by wireless communications) to the computer, so that the computer can monitor the condition of an object for which the sensor device is provided. The computer can be programmed to output a signal, such as a warning signal, when a sensed condition occurs. This warning signal may be an e-mail sent to a predetermined e-mail address, or an audio and/or video alert, so as to alert the computer operator or a possible tampering condition for an object being monitored by the sensor device.

In the wireless configuration, the processing circuitry 410 includes an antenna that is configured to output an RF (radio frequency) or IF (infrared frequency) signal to a computer (which also includes an antenna to pick up the signal output over-the-air by the antenna of the processing circuitry 410), whenever a sensed condition of activation of one or more of the sensors is detected. This outputting of the sensed condition may, in an alternative configuration, only occur when at least N sensors of the sensor array have been activated, to thereby lessen the number of false alarms reported to a central location. For example, N may be set to 16, or to some other number greater than 1, based on empirical studies of how many sensors are typically activated when an object is actually tampered with by a thief or other bad actor. That way, a condition in which a small animal traverses over the sensor array would not cause an alert to be output to a central location.

In a second embodiment, a sensor array is made up of a plurality of cords (or strips) of sensors positioned in a parallel or substantially parallel relationship (see FIG. 1), with each cord having sensors as shown in FIGS. 5A-5C, 6A-6C, 7A-7B and 8A-8F (with respectively correspond to FIGS. 7A-7C, 8A-8C, 9A-9B and 15A-15F of the '953 and '148 patents), with insulated and non-insulated wires provided in conductive and non-conductive material members making up a cord.

As discussed above, the choice of material for the components making up the sensor cord 110 is based on the particular field of use. For example, for a health care use, where flexibility is desired, materials for the various parts of the top and bottom portions 310, 320 of each sensor segment 120 are of a low durometer material, such as a silicon rubber, styrene butadiene rubber, or ethyl propylene rubber. For use in detecting tampering with a cargo shipment or for detecting illegal entrance or exit from a facility, a higher durometer material, such as MYLAR composites, polyesters, nylon or PVC may be used. Preferably, the conductive and the non-conductive materials are made of that same type of material, with the only difference being that the conductive materials are doped with a conductor such as carbon black, aluminum, tungsten or copper (to thereby make those regions conducting regions for conducting an electrical signal). This doping is done in the manufacturing of the sensor materials, whereby the construction of the sensor cord 110 is preferably done with extrudable materials, in order to lower the manufacturing costs.

FIG. 10 is a cross-sectional view showing a sensor cord with an air gap provided between top and bottom portions and which is surrounded by a non-conductive cover material, according to a second embodiment of the invention. The second embodiment is similar to the first embodiment described above, with the addition of a cover material that is provided around each sensor cord 110. In FIG. 10, as well as in FIGS. 11-14 to be discussed hereinbelow, label At 1010 represents the upper portion of a sensor cord (or a sensor segment of the sensor cord), and label Ab 1020 represents a lower portion of a sensor cord (or a sensor segment of the sensor cord), whereby the individual conductive regions separated by non-conductive material are not shown in these figures for ease in explanation (but see upper portion 310 and lower portion 320 and the individual components within these regions as shown in FIGS. 3 and 9, for example).

In FIG. 10, label B 1030 corresponds to a resilient non-conductive cover material, such as a thermo plastic elastomer (TPE). The resilient non-conductive cover material B 1030 serves several purposes. It insulates the upper portion At from the lower portion Ab. It protects the upper portion At and the lower portion Ab. Also, it forms a gap or contact area between the upper portion At and the lower portion Ab. Typical shore A hardness measurements of between 60 and 80 durometer are common for portable sensor products used to detect traffic on a highway, and can be used for a sensor array 100 that is to be durable and strong (e.g., for outside security applications). EPDM rubber is also a common material that can be used in this range of hardness. Based on the field of use of a sensor array according to the second embodiment, the hardness for the cover material B 1030 is chosen appropriately. For example, for a health care implementation, the cover material B 1030 can be flexible (e.g., stretch with a knee or elbow wrapping on which the sensor array is attached), whereby for an outside security implementation (such as for use around a military base), a very hard and rigid cover material B 1030 can be chosen.

In FIG. 10, label G 1040 represents the area (gap) between the upper and lower portions of the sensor cord 110. The physical size of the area G 1040 can be varied to suit a particular purpose of a sensor array that includes a plurality of sensor cords, as shown in FIGS. 11 and 12.

If the same materials are used to produce each sensor cord profile as shown in FIGS. 10, 11 and 12, then the sensor cord profile shown in FIG. 12 would require the least amount of force (Cp) to compress top portion At and thereby contact lower portion Ab (or vice versa), and the sensor cord profile shown in FIG. 11 would require the greatest amount of force. That is because the gap 1040 is the largest in the profile shown in FIG. 11, while the gap 1040 is the smallest in the profile shown in FIG. 12. For example, to detect very tiny forces, such as for use in a health care implementation, the gap 1040 may be sized on the order of 1-10 microns.

FIG. 13 shows one implementation of the second embodiment in which the shape of cover material B can be varied to suit a particular purpose of the sensor array. Several advantages of having a cover material having a shape (such as one with a curved surface at one side and with a pointed surface at another side) such as shown in FIG. 13 are: i) the reduction of sheer stresses when being impacted by a large force, ii) creating a "key" to register during automated production processes, and iii) mating to another component for protection purposes in final product form.

FIG. 14 shows an outside protective cover D 1410 provided around a cover material B, according to another implementation of the second embodiment. The outside protective cover D 1410 can be made using non-conductive material, since the cover material B already insulates the upper portion At from the lower portion Ab of the sensor cord 120. Alternatively, the outside protective cover D 1410 can be made using a semi-conductive material, which would be advantageous when reduction of electronic noise is desired (e.g., EMI shielding). The shape of the outside protective cover D 1410 can be altered the same as for the cover material B as explained above with respect to FIG. 13, in order to suit a particular purpose of a sensor array using such components.

FIG. 15 shows an outer shape of a sensor device 1500 that includes a plurality of sensor cords (only one shown in cross section in FIG. 15), a cover material B and a protective cover D. By way of example and not by way of limitation, the cover material B is made from a thermal plastic rubber (TPR) with a shore A hardness of 64, the protective cover D is made from an EPDM rubber with a shore A hardness of 75, and the gap area C is 0.300" wide and 0.060" high. With such a construction, a compressive force Cp of approximately 40 lbs per square inch would be required to cause a sensor segment to 'activate' (e.g., be in a contacted state) in the sensor device 1500.

A sensor array according to the previously described embodiments for use in a healthcare product, such as a knee brace, would typically need to be very sensitive. For example, a force Cp required to compress the upper portion At and the lower portion Ab to the point of contact would typically be in the tenths or hundredths of a pound per square inch. This could be accomplished by varying both the shape and type of cover material B and the shape and type of protective cover D. By way of example, the materials would be in the 20 to 40 shore A hardness ranges. Silicon rubber, styrene butadiene rubber or ethyl propylene rubber are examples of a material that could be used for the health care implementation of a sensor array.

To detect the incremental changes in pressure at such a low force Cp, very porous materials can be used. Low density or porous conditions of TPE materials is commonly produced through a manufacturing process known as "blown", which can be utilized in the present invention to provide such porous materials for components making up the top and bottom portions At, Ab, and/or the cover region C and the outside protective cover D.

For a "security" field-of-use, a sensor array according to the invention can have a protection of the outside protective cover D but with a sensitivity of a low Cp that would typically be used for healthcare products. Using materials such as PVCs, nylon and polyesters would provide a protective material in the 90 to 100 shore D hardness range. These much harder materials would be extremely durable and resist tearing and abrasion while protecting the internal sensors in each sensor cord of the sensor array.

The materials used to produce the top and bottom portions At and Ab of each sensor segment of a sensor cord can also be varied to suit a particular purpose of a sensor array. By increasing the hardness of the materials, as mentioned above, the durability would be increased. This would increase the longevity of the sensor in extreme conditions (e.g., a sensor array provided on the ground surrounding a military base).

Figure 5A:
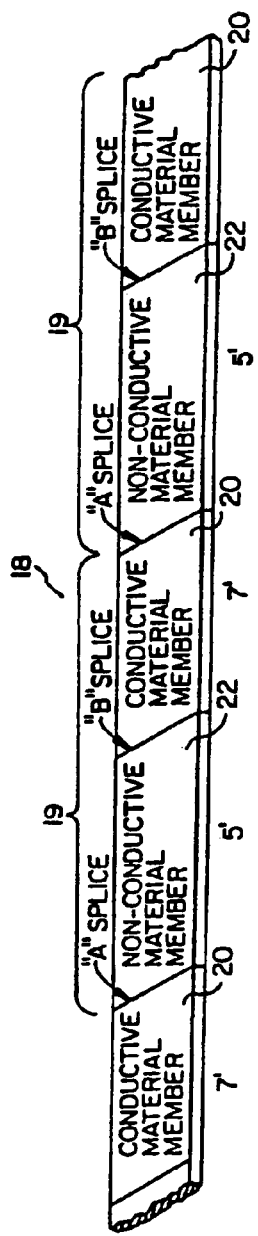
FIG. 5A shows interconnected sections of a sensor cord that may be utilized in a sensor array that includes a plurality of sensor cords, according to a second embodiment of the invention.

FIG. 5A shows a bottom wire assembly 18 for a sensor cord 50 according to a third embodiment of the invention, which uses a different construction of sensor segments as compared to the ones described above with respect to the first and second embodiments. FIG. 5A illustrates a cross section of the bottom member. Similar to the construction of the first and second embodiments, the third embodiment will preferably include a plurality of similarly-constructed components (e.g., four or more) on a top portion and on a bottom portion of a sensor cord, whereby FIG. 5A shows one such component for ease in understanding this embodiment. Each section 19 has a portion of conductive material 20 and non-conductive material 22. One such conductive material is Santoprene 101-64 and one such non-conductive material is Santoprene 199-87, which are available commercially. These materials can also be used for the conductive and non-conductive materials described with respect to the first embodiment. Also, other conductive and non-conductive materials may be used. Each section is shown to be approximately twelve feet in length with seven feet being formed of the conductive material 20 and 5 feet being formed of the non-conductive material 22. It should be noted that these dimensions are given for purposes of illustration and not by way of limitation, as those or ordinary skill will recognize the dimensions can be varied to accommodate different condition and event monitoring situations. Within each section is a plurality of conductors 24 insulated with nylon or other insulating material which are embedded in the conductive and non-conductive material.

Figure 5B:
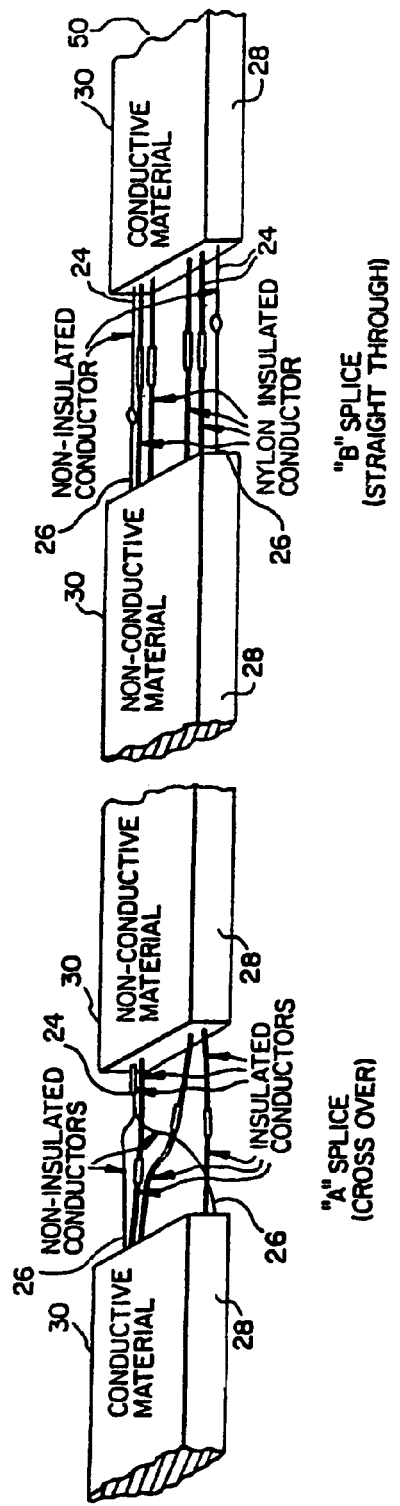
FIG. 5B shows splicing arrangements within and between sections of a sensor cord that may be utilized in a sensor array that includes a plurality of sensor cords, according to the second embodiment.

Also embedded in the non-conductive and conductive material 22, 20 are non-insulated conductors 26. Preferably, these are located as the outermost conductors closest to the front and rear surfaces 28, 30 of the conductive and non-conductive materials. FIG. 5B illustrates the splicing of the insulated conductors 24 and the non-insulated conductors 26 at the intersections between the non-conductive material and the conductive material within a section (B splice) and at the intersection between sections (A splice). The B splice is used within the section to connect corresponding insulated and non-insulated conductors together. Thus, the non-insulated outermost conductors of the non-conductive material are connected to the corresponding non-insulated conductors or wires which pass through the conductive material. Similarly, the second nylon or other insulated conductor passing through the non-conductive material 22 is connected to the second nylon or other insulated conductor passing through conductive material 20. This is repeated for the third, fourth . . . nth conductors.

Figure 7A:
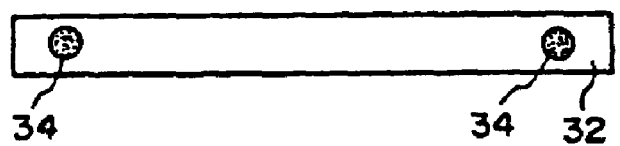
FIGS. 7A and 7B are cross sectional views of lower and upper members of a sensor cord that may be utilized in a sensor array that includes a plurality of sensor cords, according to the second embodiment.
Figure 7B:
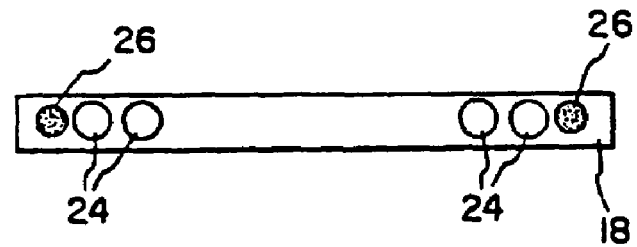

In order to perform a sensor function, a second wire assembly 32 is formed, as shown in FIG. 7B. Top wire assembly 32 is formed of conductive and non-conductive members in sections corresponding to bottom wire assembly 18. In contrast to bottom wire assembly 18, top wire assembly 32 contains only two non-insulated conductors 34 which are preferably located to correspond generally to the position of non-insulated conductors 26 in bottom wire assembly 18. Interconnections between all non-conductive and conductive members of the top wire assembly are made as straight-through B splice connections, as previously discussed. It should be noted that when assembled as shown in FIGS. 8A-8F, top and bottom wire assemblies 18 and 32 are separated by a resilient material which allows the top and bottom wires 32 and 18 to make contact only when they are compressed together.

In order to perform a sensor function for sensing activity on or around an object, a section 19 having a bottom wire 18 and a top wire 32 separated by such a resilient member is placed next to or around the object. Each time the cord section is contacted by a sufficient force, the conductive members 20 of the top wire 32 and bottom wire 18 are compressed together. This has the effect of a switch closure. The non-insulated conductors 26 and the bottom wire assembly 18 is routed to a counter and time recorder (to record number of activations of sensor and date and time of each activation). The non-insulated conductors 34 in top wire assembly 32 are routed to a reference voltage, such as ground. The force impacted on the sensor causes the conductive members to make contact and establish a circuit path between wires 34 and 26, so that the counter and time recorder attached to wires 26 can be tripped.

The above arrangement provides for sensing activity on or around an object. The outputs from the plural sensors making up a sensor cord can be counted and time recorded separately by altering which of the conductors is non-insulated in the bottom layer in each section. The sections are then wired together using a straight-through B splice. Each of the wires at the end of the cord is then connected to a separate counter and time recorder so that individual counts and activation times for the individual sections would be recorded. While such an arrangement facilitates ease of connection, it has the disadvantage that each section must have a different non-insulated conductor, thus complicating the manufacturing process.

One possible implementation of the third embodiment allows the use of the same lower member in each section with the non-insulated conductors 26 being located at the outermost portions nearest the front and rear faces 28 and 30 of the section 18. This is accomplished using the A splice wiring shown in FIGS. 5B and 5C. As FIG. 5B illustrates, the non-insulated conductors 26 are cross wired to different insulated conductors as they pass through the non-conductive material of the next section. As a result, a force impacted in the first section causes a count and time of activation to be recorded as a result of the effective switch closure in that section. The connection of the non-insulated conductors to an insulated conductor in the next section prevents a force impacted in the next section from affecting the count obtained in the adjacent lane. This is more clearly illustrated in FIG. 5C.

FIG. 5C shows a cross over configuration for a 4 lane bottom wire assembly. Since activities sensed in four separate regions in being counted, four sections, 19-1 . . . 19-4, and three A splices A-1, A-2, A-3, are required. Four counters C1, C2, . . . C4 and four time recorders (not shown) are used, with each counter being connected to one of the wires protruding from the end of the cord assembly. The simplest case is region 1 (corresponding to the area where the first sensor is located). The non-insulated conductors 26-1, 26-2 in section 19-1 are connected together and routed directly to counter C1 and time recorder (not shown). For region 2, the non-insulated conductors 26-1, 26-2 in the corresponding second section 19-2 are connected together and are routed to one of the insulated conductors 24, e.g., the first insulated conductor 24-1 in section 19-1. The other end of conductor 24-1 in section 1, is then connected to counter C2 and time recorder (not shown) at the end of the cord after passing through the section corresponding to region 1. In region 3, outer connectors 26-1 and 26-2 are routed to a corresponding insulated conductor 24-1 in section 2, which is then routed through sections via a different insulated conductor 24-2 to counter C3 and time recorder (not shown). A similar approach is taken for region 4. In region 4, the uninsulated conductor 26-1 is connected to insulated wire 24-1 in section 3, insulated wire 24-2 in section 2, and 24-3 in section 1. Insulated wire 24-3 is then connected to counter C4 and time recorder (not shown). As a result of these interconnections at the A splices, only forces sensed in region 1 causes counter C1 to be incremented, and a corresponding time of activation to be recorded. Similarly, only forces sensed in region 2 causes counter C2 to be incremented and a corresponding time of activation to be recorded. The same is true for regions 3 and 4. Thus, even though each of the sections is constructed in the same way with the non-insulated conductors being located in the bottom wire assembly at the outermost portions closest to the front and rear faces 28 and 30, the number of activations and time of activations for each region is counted separately and individually.

FIG. 5C further illustrates that all the A splice wire interconnections can be made consistent for ease of assembly. FIG. 5C also illustrates that the insulated wires in the sections can be color coded and that all the B splices within the sections are simply straight through connections of the wires between the conductive and non-conductive members of each section. Table 1 below summarizes the connections both at the counter and time recording end and at the A splices for the four-sensor-region counter using the directional sense shown in FIG. 5C. It should be noted that the method and apparatus can be expanded to incorporate any desired number of wires for any number of regions in which forces are to be sensed. In one possible implementation of the third embodiment of FIG. 5C, the uninsulated outside wires, called drain wires, are connected together within the section, with an uninsulated single wire being brought to the end of the section for splicing purposes. However, both wires could be brought out and spliced together at the A slice area.

| Region | End Connection to Counter | Section Wire | A-Splice Left Connection | A-Splice Right Connection |
|--------|---------------------------|--------------|--------------------------|---------------------------|
| 1 | C1 | 26-1 Uninsulated | Open | 24-1, yellow |
| 2 | C2 | 24-1 yellow | 26-1, Uninsulated | 24-2, green |
| 3 | C3 | 24-2 green | 24-1, yellow | 24-3, red |
| 4 | C4 open | 24-3 red 24-4 white | 24-2, green 24-3, red | 24-4, white open |

Figure 6A:
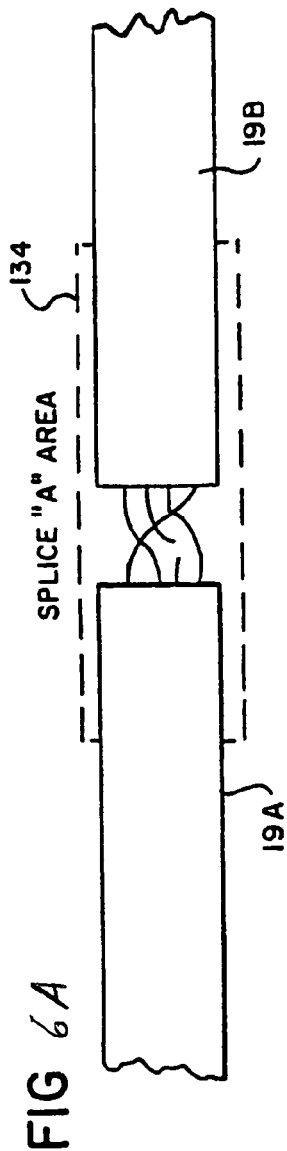
FIGS. 6A, 6B and 6C illustrate alternative section mating configurations at the splice area, for a sensor cord that may be utilized in a sensor array that includes a plurality of sensor cords, according to the second embodiment.
Figure 6B:
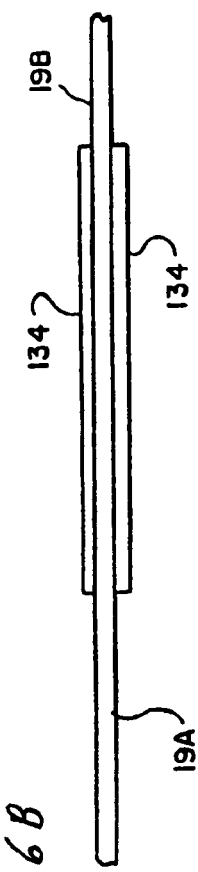
Figure 6C:
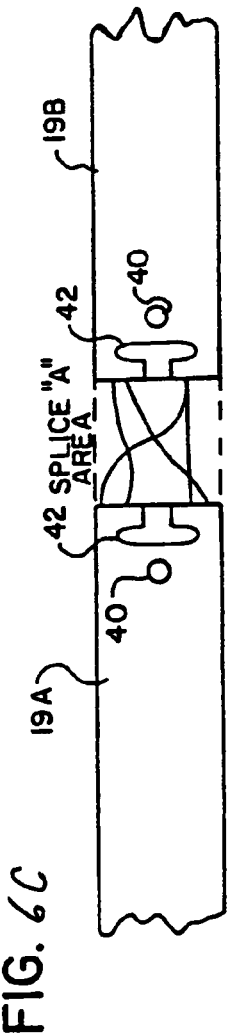

FIGS. 6A, 6B, and 6C illustrate details of the splice A area between, for example, two sections 19a and 19b. In the configuration shown in FIGS. 6A and 6B, the splice is formed by overlapping a slightly wider member 34 across the intersection of the two sections 19a and 19b. As shown in FIG. 6A, if the members 19a and 19b of the sections have a width of 0.70 inches, the overlapping member 34 would have a width of 0.775 inches. FIG. 6B shows a side elevational view indicating that the thickness of the members 19a and 19b is 0.075 inches while the overall thickness of the splice area including a pair of overlapping members would be 0.135 inches. This is because each of the overlapping splice members 34 has a thickness of 0.030 inches. It should be noted that the above dimensions are by way of illustration and are not limitative in the invention, as different dimensions could be used for any of the numbers. FIG. 6C illustrates an alternative detail of a splice A area configuration. The top view shown in FIG. 6C illustrates that the section 19a and 19b are formed with hole 40 and notch 42 to facilitate gripping. The overlapping numbers would have corresponding protrusions which would be snapped into the holes. FIG. 8A shows an overall perspective view of a sensor cord that may be utilized in the third embodiment, and FIG. 8B is an exploded end view of the sensor cord of FIG. 8A. FIG. 8C is an exploded view of an "A" splice that may be utilized in the third embodiment, FIG. 8D is an exploded view of a "B" splice that may be utilized in the second embodiment, FIG. 83 is an exploded end view of a top wire that may be utilized in the second embodiment, and FIG. 8F is an exploded end view of a bottom wire that may be utilized in the second embodiment.

In a fourth embodiment, the sensor materials are made from a material having a porous composition (e.g., similar to a composition of a sponge), whereby the stretching of sensor segments having such a composition would be detectable by way of the changed characteristics of those segments when they are in a stretched state or an unstretched state. In effect, the sensor segments operate as a 'skin.' By way of example, when a sensor array is fixedly attached to a netting that is tightly wrapped around a palette that is to be shipped, the netting is likely to be stretched at certain positions around the palette. This stretching will likely cause one or more sensor segments in one or more sensor cords of the sensor array to be in an 'active' (compressed) state, whereby this 'steady state' condition is recorded by the processing circuitry. During the time that the palette is shipped from one location to another location, the palette will likely move and thereby contact other surfaces, whereby these movements will likely cause one or more sensors to be activated, and whereby these activations and times of activations can be recorded by the processing circuitry for historical purposes. That way, if an article of manufacture is received at a destination in a damaged condition, the recorded history of its shipment can be obtained from the processing circuitry and analyzed to determine where and how that damage occurred.

The use of porous materials for sensor segments according to the fourth embodiment is also applicable for the use of the sensor array for health care applications. By way of example, if a sensor array is fixedly attached to a stretchable arm bandage, the exercise movements of a patient can be monitored based on monitoring of which of the sensor segments of the sensor cords are activated and at what times they are activated. Thus, if a patient is moving his/her arm (with the arm bandage on it) from a position perpendicular to an arm rest to a position down against the arm rest, this movement will cause one or more sensor segments to be activated during that movement (either due to the sensors making contact with the arm rest or the sensors being stretched so much that they reach an activated state), whereby that information can be stored in the processing circuitry (and/or sent from the processing circuitry to a central computer, either by wired or by wireless communications), so that the patient's exercises can be monitored in either real time or analyzed at a later point in time.

As the sensor segments are stretched, the porous materials comprising each sensor segment also stretch, thereby changing the resistance properties of each sensor segment. Thus, if a sensor cord is stretched, that will cause the sensor segments comprising that sensor cord to also undergo stretching. Signals output from the processing circuitry, which is provided to the bottom portion of each sensor segment, will be received by the processing circuitry by way of the top portion of each sensor segment that is contacted with the top portion, whereby the amount of stretching will be determined based on the strength of the signal received by the processing circuitry. Thus, if the processing circuitry outputs a signal with a voltage level of A volts, and whereby the processing circuitry receives a signal with a voltage level of B volts, whereby B<A, the amount that B is less than A will determine (based on tests previously performed on the sensors during different levels of stretching) the amount of stretching that has occurred during that activated state. This information is very useful during analysis of a shipment of cargo, or for analysis of a patient's exercises during a physical therapy session, for example. Possible materials to be utilized for the stretchable, porous material used in the fourth embodiment include low durometer materials such as silicon rubber, styrene butadiene rubber, and/or ethyl propylene rubber.

In the first through fourth embodiments, the time when a particular sensor has been activated can be recorded by processing circuitry (see FIG. 4, for example) that has a time calculation function, whereby that sensor activation time is stored in a memory of the processing circuitry for later retrieval, or which is outputted immediately by the processing circuitry by wireless or wired means. That way, historical information of an object, such as cargo that has been shipped from one location to another location, can be determined, in order to determine where and when an unlawful breach or event occurred with respect to the cargo being shipped. For example, in a case whereby an array of sensors are provided on a mat, that mat may be used as a race starting detector for detecting whether or not a person involved in a race has left before an authorized start time of an event. A swimmer standing on a mat provided at an edge of a swimming pool would maintain a plurality of sensors on the sensor array provided on the mat in an activated state, and whereby when the swimmer leaves the mat to thereby enter the pool, that time of leaving the mat will be recorded at a time corresponding to when none of the sensors making up the sensor array is in the activated state. Based on that 'no sensor activated' time, it can be determined whether or not a false start condition has occurred for that swimmer (e.g., a light would be turned on for the lane of the swimmer who caused the false start condition, as enabled by a processor circuit coupled to the sensor array).

In a health care implementation, in which the array of sensors according to any of the previously described embodiments may be utilized, the array of sensors are securely attached (e.g., by thread, such as shown in FIG. 2) to a stretchable member, such as a stretchable arm or leg wrap that is used for physical therapy, whereby movement of the patient's arm or leg will cause one or more sensors attached to the arm or leg wrap to output a 'sensed' condition. For example, when a patient moves his or her arm down to a table top from a straight up-and-down position, to thereby exercise that arm, the contact of sensors of the patient's arm to the table top will cause one or more sensors to output a sensed condition (e.g., the top and bottom portions of these sensors will be pressed together, to thereby provide a closed circuit and thus a signal to the processing circuitry), which can be monitored to determine a patient's progress during a physical therapy session.

Many other changes and modifications may be made to the present invention without departing from the spirit thereof. The scope of these and other changes will become apparent from the appended claims. For example, the computer processing elements described with regards to the embodiments of the present invention may be implemented in software being run on a general purpose computer or by a special purpose computer, and/or by application specific integrated circuits (ASICs) or field programmable gate arrays (FPGAs), or a combination thereof. For example, the processing circuitry could be implemented as an ASIC or as an FPGA. Furthermore, while the first embodiment was described having 4 conductive members on the top and bottom portions, to thereby allow for 16 distinct sensors per sensor cord, other numbers of conductive members may be provided on the top and bottom members. By way of example, having 5 conductive members on the top and bottom members allows for having 25 (=$5^2$) distinct sensors (segments) per sensor cord, whereby activation of any one or more of those 25 sensors can be determined by way of the IC connected to the sensor cord.

What is claimed is:

1. A sensing device comprising:
a plurality of sensor cords provided in a parallel or substantially parallel arrangement, each of the sensor cords including a plurality of sensors disposed adjacent one another, each of the plurality of sensors comprising:
a resilient top portion having at least one resilient conductive member;
a resilient lower portion having a plurality of active sections and a plurality of resilient lower portion conductive members channeled and interconnected through the lower portion, the lower portion conductive members being separated by non-conductive material;
each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section;
at least one control circuit respectively provided at one end of each of said sensor cords, wherein said at least one control circuit is an integrated circuit that provides at least one of power, ground and signaling to said each of said sensor cords; and
a non-conductive spacer provided between the resilient top portion and the resilient lower portion, wherein a gap in which no spacer material exists is also provided between the resilient top portion and the resilient lower portion, wherein the non-conductive spacer is made of a flexible material such that when a predetermined force is applied thereto, the resilient top portion and the resilient lower portion meet at a region corresponding to the gap.

2. The sensing device according to claim 1, wherein the resilient top portion has a plurality of active sections and a plurality of resilient upper portion conductive members channeled and interconnected through the top portion, the top portion conductive members being separated by non-conductive material.

3. The sensing device according to claim 1, wherein the resilient top portion has a plurality of active sections and wherein each active section of the resilient top portion further comprises a layer of resilient conductive material at a bottom of the top portion, resilient non-conductive material arranged over the top conductive members to insulate the top portion conductive members from the conductive layer, and a communicating conductive material passing through the non-conductive material to connect one of the top conductive members to the resilient conducting material on bottom of the active section.

4. The sensing device according to claim 1, further comprising:
means for fitting the sensing device on another object.

5. The sensing device according to claim 4, wherein the fitting means is thread for securely fitting the sensing device on a mat or a net.

6. The sensing device according to claim 5, wherein the thread is nylon thread.

7. The sensing device according to claim 4, wherein the fitting means is glue for securely fitting the sensing device on the another object.

8. The sensing device according to claim 1, further comprising:
a non-conductive cover material surrounding each of the plurality of sensors.

9. The sensing device according to claim 8, further comprising:
an outside protective cover surrounding said non-conductive cover material, said outside protective cover operating as an EMI shield for the sensing device.

10. The sensing device according to claim 1, wherein the flexible material making up the non-conductive spacer is thermo plastic elastometer.

11. A method for sensing an event, comprising:
a) providing a plurality of sensor cords in a parallel or substantially parallel arrangement, each of said sensor cords including a plurality of sensors disposed adjacent one another, each of said sensor cords comprising:
a resilient top portion having at least one resilient conductive member;
a resilient lower portion having a plurality of active sections and a plurality of resilient lower portion conductive members channeled and interconnected through the lower portion, the lower portion conductive members being separated by non-conductive material;
each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section;
b) sensing the event by way of activation of at least one sensor provided on at least one of said plurality of sensor cords;
c) providing at least one control circuit at one end of each of said sensor cords, wherein each of said at least one control circuit is an integrated circuit that provides at least one of power, ground and signaling to said each of said sensor cords; and
d) providing a non-conductive spacer between the resilient top portion and the resilient lower portion, wherein a gap in which no spacer material exists is also provided between the resilient top portion and the resilient lower portion,
wherein the non-conductive spacer is made of a flexible material such that when a predetermined force is applied thereto, the resilient top portion and the resilient lower portion meet at a region corresponding to the gap.

12. The method according to claim 11, wherein the resilient top portion has a plurality of active sections and a plurality of resilient upper portion conductive members channeled and interconnected through the top portion, the top portion conductive members being separated by non-conductive material.

13. The sensing device according to claim 11, wherein the resilient top portion has a plurality of active sections and, wherein each active section of the resilient top portion further comprises a layer of resilient conductive material at a bottom of the top portion, resilient non-conductive material arranged over the top conductive members to insulate the top portion conductive members from the conductive layer, and a communicating conductive material passing through the non-conductive material to connect one of the top conductive members to the resilient conducting material on bottom of the active section.

14. The method according to claim 11, further comprising: fitting the sensing device on another object.

15. The method according to claim 14, wherein the fitting is performed by glue, thread or a mechanical fastener for securely fitting the sensing device on the another object.

16. The method according to claim 15, wherein the fitting is performed by use of a thread for securely fitting the sensing device on a mat or a net.

17. The method according to claim 16, wherein the thread is nylon thread.

18. The method according to claim 11, further comprising: providing a non-conductive cover material that surrounds each of the plurality of sensors.

19. The method according to claim 18, further comprising: providing an outside protective cover that surrounds said non-conductive cover material, said outside protective cover operating as an EMI shield for the sensing device.

20. A method for sensing an event, comprising:
a) providing a plurality of sensor cords in a parallel or substantially parallel arrangement, each of said sensor cords including a plurality of sensors disposed adjacent one another, each of said sensor cords comprising:
a resilient top portion having at least one resilient conductive member;
a resilient lower portion having a plurality of active sections and a plurality of resilient lower portion conductive members channeled and interconnected through the lower portion, the lower portion conductive members being separated by non-conductive material;
each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section;
b) sensing the event by way of activation of at least one sensor provided on at least one of said plurality of sensor cords;
c) providing at least one control circuit at one end of each of said sensor cords, wherein each of said at least one control circuit is an integrated circuit that provides at least one of power, ground and signaling to said each of said sensor cords;
d) providing a non-conductive cover material that surrounds each of the plurality of sensors; and
e) providing an outside protective cover that surrounds said non-conductive cover material, said outside protective cover operating as an EMI shield for the sensing device
wherein the outside protective cover includes an inside protection portion provided between the resilient top portion and the resilient lower portion, wherein a gap in which no spacer material exists is also provided between the resilient top portion and the resilient lower portion.

21. The method according to claim 20, wherein the flexible material making up the non-conductive spacer is thermo plastic elastometer.

22. A sensing device comprising:
a plurality of sensor cords provided in a parallel or substantially parallel arrangement, each of the sensor cords including a plurality of sensors disposed adjacent one another, each of the plurality of sensors comprising:
a resilient top portion having at least one resilient conductive member;
a resilient lower portion having a plurality of active sections and a plurality of resilient lower portion conductive members channeled and interconnected through the lower portion, the lower portion conductive members being separated by non-conductive material;
each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section; and at least one control circuit respectively provided at one end of each of said sensor cords, wherein said at least one control circuit is an integrated circuit that provides at least one of power, ground and signaling to said each of said sensor cords, wherein the at least one resilient conductive member has a sponge-like consistency in which a resistance value of the at least one resilient conductive member changes based on an amount of stretching applied to the at least one resilient conductive member.

23. A method for sensing an event, comprising:
a) providing a plurality of sensor cords in a parallel or substantially parallel arrangement, each of said sensor cords including a plurality of sensors disposed adjacent one another, each of said sensor cords comprising:
   a resilient top portion having at least one resilient conductive member;
   a resilient lower portion having a plurality of active sections and a plurality of resilient lower portion conductive members channeled and interconnected through the lower portion, the lower portion conductive members being separated by non-conductive material;
   each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section;
b) sensing the event by way of activation of at least one sensor provided on at least one of said plurality of sensor cords; and
c) providing at least one control circuit at one end of each of said sensor cords, wherein each of said at least one control circuit is an integrated circuit that provides at least one of power, ground and signaling to said each of said sensor cords,
wherein the resilient top portion has a plurality of active sections and a plurality of resilient upper portion conductive members channeled and interconnected through the top portion, the top portion conductive members being separated by non-conductive material, and
wherein the at least one resilient conductive member has a sponge-like consistency in which a resistance value of the at least one resilient conductive member changes based on an amount of stretching applied to the at least one resilient conductive member.

24. A sensing device comprising:
a plurality of sensor cords provided in a parallel or substantially parallel arrangement, each of the sensor cords including a plurality of sensors disposed adjacent one another, each of the plurality of sensors comprising:
   a resilient top portion having at least one resilient conductive member;
   a resilient lower portion having a plurality of active sections and a plurality of resilient lower portion conductive members channeled and interconnected through the lower portion, the lower portion conductive members being separated by non-conductive material;
   each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section; and
at least one control circuit respectively provided at one end of each of said sensor cords, wherein said at least one control circuit is an integrated circuit that provides at least one of power, ground and signaling to said each of said sensor cords,
wherein the at least one control circuit respectively provided at one end of each of said sensor cords comprises a plurality of said control circuits, and wherein said plurality of said control circuits are capable of detecting a plurality of separate contacts of respective top and lower portions of a plurality of said active sections of said plurality of sensors at a same moment in time.

25. A sensing device comprising:
a plurality of sensor cords provided in a parallel or substantially parallel arrangement, each of the sensor cords including a plurality of sensors disposed adjacent one another, each of the plurality of sensors comprising:
   a resilient top portion having at least one resilient conductive member;
   a resilient lower portion having a plurality of active sections and a plurality of resilient lower portion conductive members channeled and interconnected through the lower portion, the lower portion conductive members being separated by non-conductive material;
   each active section further comprising a layer of resilient conductive material at a top of the lower portion, resilient non-conductive material arranged over the lower conductive members to insulate the lower portion conductive members from the conductive layer, and a communicating conductive material passing through the non-conductive material to connect one of the conductive members to the resilient conducting material on top of the active section; and
at least one control circuit respectively provided at one end of each of said sensor cords, wherein said at least one control circuit is an integrated circuit that provides at least one of power, ground and signaling to said each of said sensor cords,
wherein the at least one control circuit respectively provided at one end of each of said sensor cords provides each of power, ground and signaling to said each of said sensor cords.

* * * * *